Figure 1:
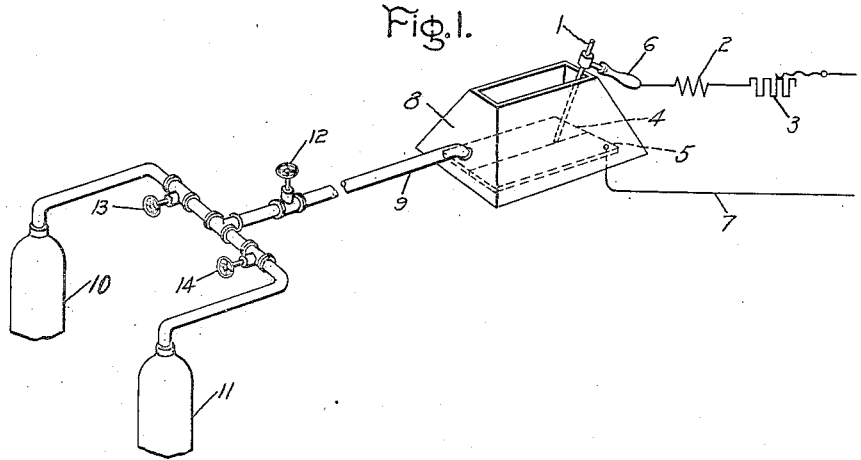

Feb. 4, 1930.   E. THOMSON   1,746,202
ELECTRIC WELDING
Filed Aug. 26, 1925   3 Sheets-Sheet 1

Inventor:
Elihu Thomson,
by *Alexander D. Lunt.*
His Attorney.

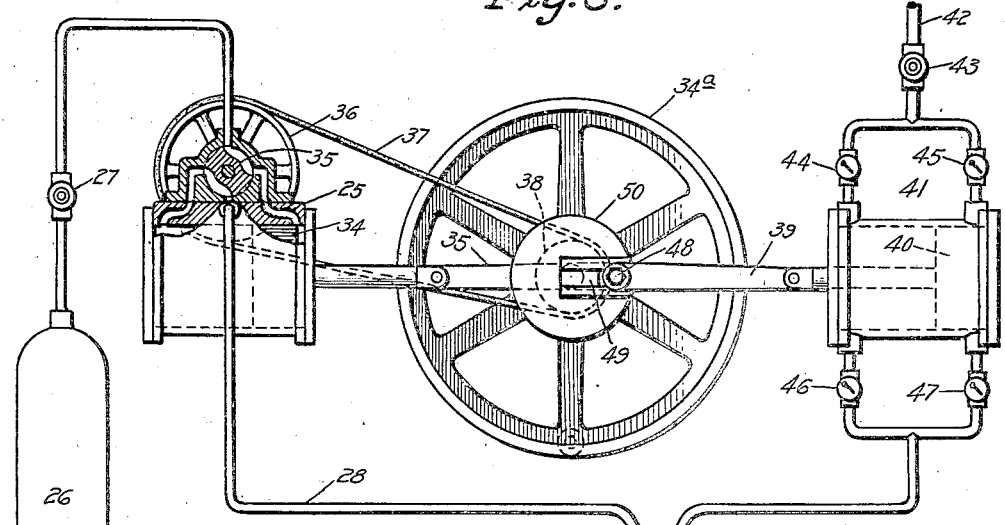
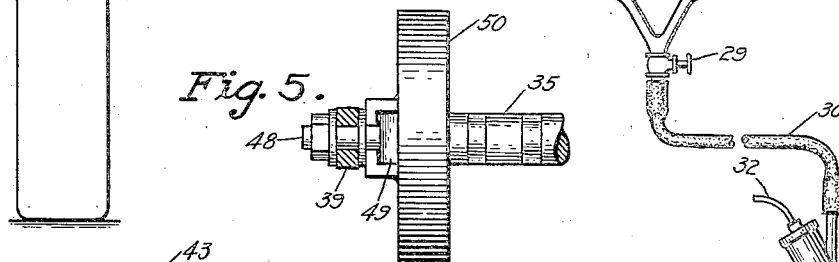
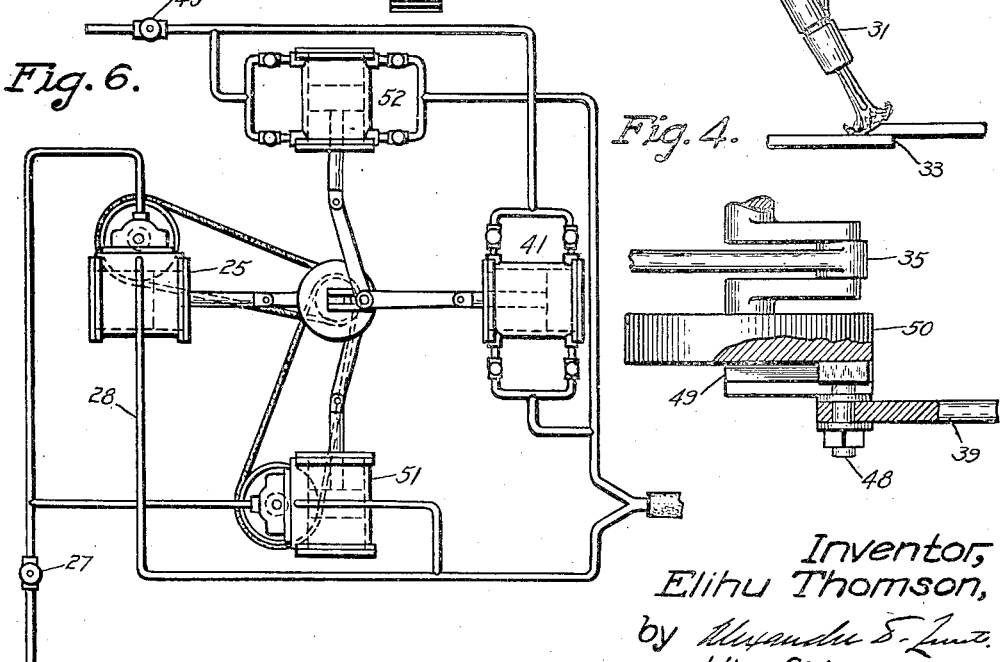

Feb. 4, 1930. E. THOMSON 1,746,202
ELECTRIC WELDING
Filed Aug. 26, 1925 3 Sheets-Sheet 3

Inventor:
Elihu Thomson,
by [signature]
His Attorney.

Patented Feb. 4, 1930

1,746,202

UNITED STATES PATENT OFFICE

ELIHU THOMSON, OF SWAMPSCOTT, MASSACHUSETTS, ASSIGNOR TO GENERAL ELECTRIC COMPANY, A CORPORATION OF NEW YORK

ELECTRIC WELDING

Application filed August 26, 1925. Serial No. 52,680.

My invention relates to electric arc welding, and has for its principal object the provision of an improved method and apparatus whereby strong and ductile welds may be economically produced.

It is well known that electric arc welds made in air are characterized by a lack of ductility. This brittleness or lack of ductility has been ascribed to various causes. It seems to be the result of compounds formed when the weld metal is subjected to the extremely high temperature of the electric arc in the presence of certain gases. It has been found, for example, that the weld metal is brittle and easily broken as on bending when it is oxidized or contains nitrides. Welds made in an atmosphere of carbon dioxide or illuminating gas are likewise lacking in ductility.

Perfectly ductile welds may, however, be made in an atmosphere of hydrogen. An example of such welding is disclosed and claimed in the application of Peter P. Alexander, Serial No. 758,082, filed Dec. 26, 1924, for methods and apparatus for electric arc welding, assigned to the same assignee as the present application. The welding arc maintained in an atmosphere of substantially pure hydrogen is characterized by an arc voltage which is about twice the arc voltage of that in air, and such welding is also characterized by the fact that a very much higher striking voltage is necessary than is necessary in air to strike and maintain the arc. It has been found that a minimum striking voltage of about 120 volts is necessary in the hydrogen atmosphere. This striking voltage may be obtained by providing a source having a sufficiently high open circuit voltage or by using a source whose open circuit voltage may be considerably lower than 120 volts provided a sufficiently great amount of reactance is used in the welding circuit. The higher arc voltage is advantageous where a large amount of energy is desired in the arc, as, for example, where work of considerable thickness is to be welded. The greater energy results in higher speeds of welding. For many classes of work, however, an arc voltage substantially the same as that in air is sufficient and in accordance with one aspect of my invention welding equipments adapted to produce the voltages required for arc welding in air can be used for producing ductile welds in a gaseous medium. For overhead welding the lower arc voltage is preferable since the metal does not run down so readily.

I have found it possible to produce ductile welds in a gaseous medium composed wholly of carbon monoxide or of a mixture of carbon monoxide and hydrogen. In pure carbon monoxide the arc voltage is slightly below that in air. With the addition of hydrogen it rises gradually and reaches about the same value as that in air for mixtures of approximately 30% hydrogen and 70% carbon monoxide. In accordance with my invention the gaseous medium which surrounds the arc and excludes atmospheric air from the arc stream and the molten parts of the work to be welded may be produced by mixing separate gases before they reach the arc or by decomposing a suitable medium at the arc to produce an atmosphere composed preferably substantially of carbon monoxide and hydrogen. It is preferable substantially to eliminate oxygen from the gaseous medium, and it is preferable that the gaseous medium be such that free oxygen does not result from the dissociation of the medium in the arc. When, for example, carbon dioxide alone is used, this is apparently decomposed, where in contact with the core of the arc stream which is of tremendously high temperature, into carbon monoxide and oxygen and the oxygen combines with the metal of the weld resulting in a brittle weld. Nitrogen in the presence of even small amounts of carbon where oxygen is present appears to combine with the weld metal to produce brittle welds. It is, therefore, preferable substantially to exclude nitrogen under such conditions. The gaseous medium may be applied as in the case of hydrogen so as to exclude atmospheric air from the arc stream and the molten parts of the work so as to eliminate the deleterious action of the oxygen and nitrogen of atmospheric air. The gaseous medium supplied to or produced at the arc should be chemically active to reduce oxides present in the work or in the electrode where a metallic electrode is used the metal of which is deposited in the weld, and to counteract the action of any small amount of atmospheric air which may become admixed with the gaseous medium during the welding process.

While carbon dioxide alone will produce brittle welds, if this gas is used with a hydrocarbon medium of the proper proportions, a gaseous medium of carbon monoxide and hydrogen may be produced at the arc so as to produce ductile welds, although the hydrocarbon medium alone may be of such a composition as to produce perfectly brittle welds when used alone. For example, as hereinafter described, propane and carbon dioxide may be used to produce ductile welds, although either used alone will produce brittle welds. The use of carbon dioxide and a gas capable of producing with carbon dioxide in the presence of the arc an actively reducing mixture comprising carbon monoxide and hydrogen, for example a hydrocarbon such as propane, for the production of ductile welds forms the subject matter of my divisional application Serial No. 389,892 filed September 3, 1929.

In accordance with my invention, the expense of providing a suitable gaseous medium for producing ductile welds is lower than that incident to the use of hydrogen alone due to the fact that the gaseous medium may be produced cheaply and simply at the place of welding thus avoiding the transportation of cylinders of gases or, where the gas is used in cylinders or containers, gases may be used which are relatively inexpensive and which may be transported and stored in compressed and liquefied form.

Carbon monoxide is a poisonous gas and its use would require precautionary measures to avoid danger to life. A suitable odorant element may be added in minute quantities to indicate the escape of such a poisonous gas. Water gas, which comprises about equal percentages by volume of carbon monoxide and hydrogen, may be used either by mixture of the gases from cylinders or by production of the gas directly in a suitable water gas generator, a simple type of which is hereinafter described. An automatic valve may be provided as hereinafter described which turns on the gas only when the welding arc is in operation. In this way danger to life is eliminated, since, while the arc is in operation, the carbon monoxide burns to carbon dioxide which is harmless. Apparatus for electric arc welding comprising means for maintaining an arc, means for supplying to the arc a gas producing medium, and means controlled by an electrical characteristic of the arc for controlling the supply of said medium to the arc, forms the subject matter of my divisional application Serial No. 379,290 filed July 18, 1929. Where a non-poisonous medium is used which is dissociated by the arc into carbon monoxide and hydrogen there is no possibility of danger to life since any carbon monoxide which does not take up oxygen from the work or electrode combines with the oxygen of the air and burns to carbon dioxide during welding, and whenever the arc is interrupted the production of carbon monoxide ceases.

Since the mixture of carbon monoxide with hydrogen reduces the arc voltage and striking voltage below that required for pure hydrogen, it is practicable to use a welding equipment designed for arc welding in air to produce welds in the gaseous mixture. For example, a generator having an open circuit voltage of about 75 volts may be used for welding in water gas without more reactance in the circuit than is customarily used for arc welding in air.

My invention is not limited to low arc voltages and striking voltages. It has been found, for example, that it is possible to produce a suitable mixture of gases by dissociating in the arc the vapor of an alcohol, such as methanol or methyl hydrate, ordinarily known as wood spirit or methyl-alcohol, and in such case the arc voltage is approximately two-thirds that in substantially pure hydrogen. A generator having an open circuit voltage of about 75 volts has been found to be sufficient to strike and maintain the arc. The peculiar facility with which this liquid can be transported and the ease with which it may be vaporized and applied to the welding device is of great importance in the commercial application of my invention. Being a liquid which is stable under atmospheric pressure there is no need of transportation in gas tanks and as it boils at a comparatively low temperature small quantities of it at a time may be fed into a vaporizer and the vapor directed so as to surround the arc during welding. Modern methods of synthetically producing methanol make it one of the cheapest possible sources of a suitable vapor which may be dissociated by the welding arc to produce a suitable gaseous mixture for producing ductile welds. An advantage of methanol is that it is not of a complex nature but a single chemically pure product represented by the formula $CH_3OH$. In the arc the vapor is decomposed into one volume of carbon monoxide mixed with two volumes of hydrogen. An example of such welding is disclosed and claimed in my joint application with Peter P. Alexander, Serial No. 60,895, filed October 6, 1925, for methods and apparatus for electric arc welding, assigned to the same assignee as the present application.

It has been found that the striking voltage in hydrogen may be reduced by the addition of a small amount of argon and such an expedient may be resorted to where it is desired to lower the striking voltage in a medium which ordinarily requires a high voltage. Welding in the presence of argon or in an atmosphere of argon is described and claimed in the application of Philip K. Devers, Serial No. 118,605, filed June 25, 1925, for arc welding, and assigned to the same assignee as the present application.

My invention, as in the case of arc welding in a hydrogen atmosphere, may be used for manual, semi-automatic or fully automatic arc welding. In manual arc welding, the operator by the aid of a suitable electrode holder strikes and maintains the arc manually. In semi-automatic arc welding means are provided for automatically feeding the electrode to compensate for its consumption, and in full automatic arc welding the electrode is not only automatically fed to compensate for its consumption but automatic means are provided for producing relative movement between the arc and the work along the line of the joint to be welded. While my invention is peculiarly applicable to welding of the type where metal is deposited from a fusible electrode, such as an iron or steel electrode, it is also applicable where a carbon electrode is used. Where the arc is between the electrode and the work, the work is preferably positive. My invention is also applicable in its broader aspects to arc welding systems in which the arc is maintained between a plurality of electrodes instead of between an electrode and the work to be welded and non-consuming electrodes may be used, if desired.

My invention will be better understood from the following description when considered in connection with the accompanying drawings, and its scope will be pointed out in the appended claims.

Figure 2:
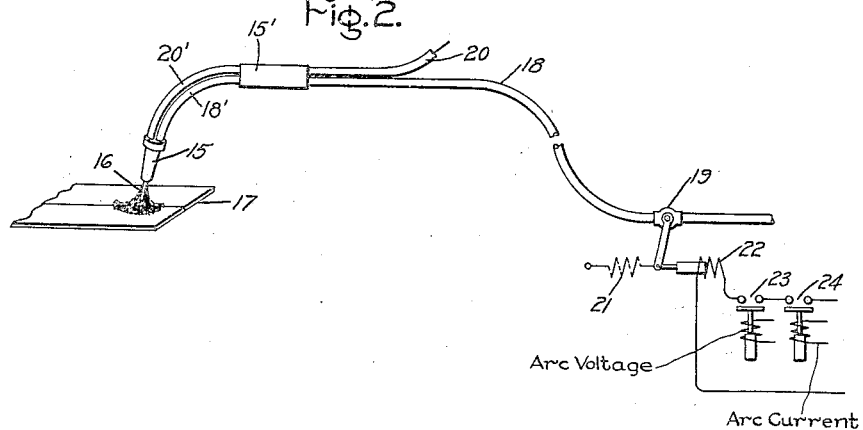
Figure 7:
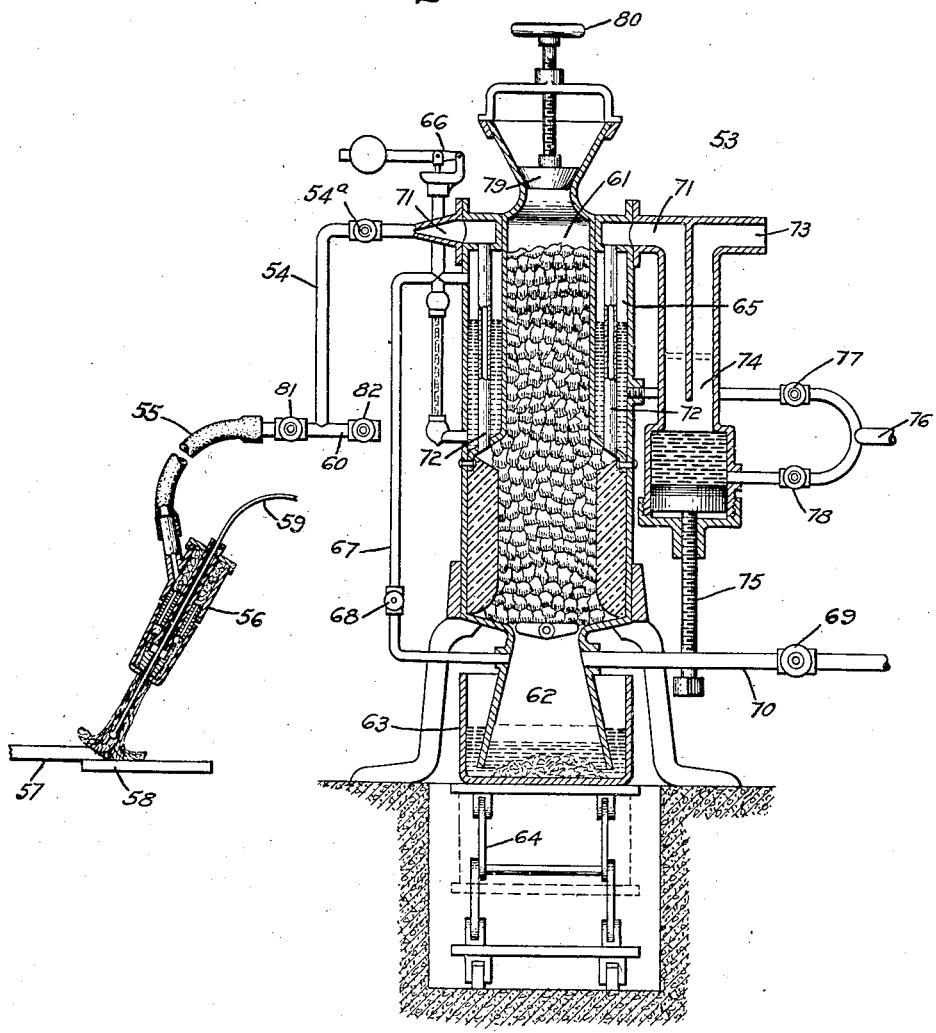

In the drawings Fig. 1 diagrammatically represents my invention as applied to manual arc welding. Fig. 2 represents my invention applied to semi-automatic arc welding and diagrammatically illustrates how means may be applied automatically to control the supply of gas to the welding tool. Fig. 3 represents an embodiment of my invention comprising an example of means for suitably proportioning separate gases which are deliverel to the welding apparatus. Figs. 4 and 5 show details of the apparatus of Fig. 3. Fig. 6 represents a modification of the apparatus of Fig. 3, and Fig. 7 shows a suitable type of gas producer which may be used for producing either water gas or carbon monoxide.

Fig. 1 shows diagrammatically an arrangement for hand welding in the gaseous atmosphere. The electrode 1, which may be either a metallic or carbon electrode, is indicated as connected to a supply circuit through a reactor 2 and resistor 3. The work is shown as a pair of plates 4 and 5. The electrode is indicated as held by a suitable holder 6 adapted to be manipulated to cause the arc to be established and maintained between the electrode and the work during the welding operation. The lead 7 is shown for connecting the work to the other side of the supply circuit. In order to simplify the drawing, the source is not shown but it may be a constant potential source where a series stabilizing resistor such as 3 is used. The source may, however, be an inherently regulated generator which may supply the arc without the use of a stabilizing resistance. A hood 8 of suitable material, such as asbestos, is shown as covering the work. It may be comparatively small and cover but a portion of the work. The purpose is to exclude atmospheric air from the arc and the molten portion of the work. The hood has an open top which is only sufficiently large to permit the operator to manipulate the electrode readily. During welding, the gases burn for a short distance above the opening in the hood. The gaseous medium is conducted to the hood through the conduit 9 from gas containers 10 and 11. A valve 12 is provided for controlling the supply of gases to the receptacle 8 and valves 13 and 14 are provided for adjusting the admixture of the gases to produce the proper atmosphere within the receptacle. It will be apparent that my invention is in nowise limited to the apparatus described.

Fig. 2 shows the application of my invention to a semi-automatic welding apparatus which may be, for example, of the general type disclosed in Letters Patent to P. O. Noble, No. 1,508,711, Sept. 16, 1924. In this type of apparatus, means are provided for automatically feeding the electrode to the work to maintain the arc. Since such means form no essential part of my invention, they have not been shown in the figure. The figure shows an electrode delivery and gas discharge nozzle 15 through which an electrode 16 may be advanced toward the work by suitable means. The nozzle contains or has associated therewith a passageway adapted to be connected with a source of gas or vapor supply through a conduit 18 shown provided with an automatically controlled valve 19. The conduit leading to the welding tool may be a flexible hose. The part 15' of the tool may be held in the hand of the welder and may be provided with suitable switch contacts for remotely controlling the welding circuit. Examples of such circuit controlling means are well known in the art. The electrode may be guided to the tool through a flexible guide tube 20 which may have the welding lead and control wires incorporated therein or secured thereto. The curved piece 20' may be a small pipe of brass or the like through which the electrode is fed and with which it makes good contact as it is forced around the curve. The part 18' is an extension of the conduit 18 and may be either a small piece of pipe or a piece of flexible hose which may be bound against the pipe 20'. In order to ensure that gas is discharged at the nozzle 15 only during the welding operation, the valve 19 is biased to closed position by means of a spring 21 and is arranged to be operated to its open position in response to energization of a solenoid 22, the operating coil of which is supplied with current from any suitable source through relay switches 23 and 24. As indicated by the legends "Arc voltage" and "Arc current," the switches 23 and 24 are operable in accordance with the arc voltage and arc current respectively. With this arrangement, the solenoid is deenergized either when the arc is interrupted or when a short-circuit is established between the work and electrode, thus ensuring that the valve 19 is always closed when the gas is not utilized in producing a weld.

As previously indicated a combination of carbon monoxide and hydrogen suitable for welding is produced when a proper mixture of carbon dioxide and a hydrocarbon, such as propane or $C_3H_8$ for example, is subjected to the high temperature of the arc. Under these conditions the propane liberates large amounts of carbon, the carbon dioxide is dissociated by the arc into carbon monoxide and oxygen, and the liberated carbon and oxygen instantly combine to form carbon monoxide if the gases have been mixed in proper proportions. This reaction proceeds in the following steps:

$$C_3H_8 + 3CO_2 + 237970 \text{ calories} = 6C + 4H_2 + 3O_2$$
$$6C + 4H_2 + 3O_2 - 87480 \text{ calories} = 4H_2 + 6CO$$

It will be observed that the final product of this reaction is a mixture comprising 60% of carbon monoxide and 40% of hydrogen. This mixture has substantially the same arc and striking voltages as air and welds produced in it have been found to be strong and ductile. The utilization of carbon dioxide and propane as the raw materials for producing this mixture is advantageous for the reason that these gases are readily available and can be purchased at low cost. These gases are, moreover, non-poisonous.

Any suitable apparatus may be provided for producing the proper admixture of gases where a plurality of gases are used. Fig. 3 shows a gas mixing apparatus comprising a fluid pressure engine 25 adapted to be operated by gas supplied from the tank 26 through a valve 27 and exhausted through pipe 28, valve 29 and flexible tube 30 to the welding tool 31 through which the electrode 32 is fed to the work 33 by any suitable means to maintain the arc. The engine 25 is provided with a piston 34 coupled to a fly wheel 34ᵃ through a connecting rod 35 and a suitable crank arm fixed to the fly wheel 34ᵃ and is arranged to have its pilot valve 35 operated by means of a pulley 36 coupled through belt 37 to a pulley 38 arranged to rotate with the fly wheel 34ᵃ. The engine 25 is also coupled through means comprising the connecting rod 35', fly wheel 34ᵃ and a connecting rod 39 to the piston 40 of a pump 41 which is operated to deliver gas from a suitable source through pipe 42, valve 43, check valves 44 to 47, valve 29 and flexible tube 30 to the welding head 31 at a rate determined by the operation of the engine 25. Suitable cross heads, not shown, will of course be provided to cause the piston rods to move rectilinearly.

With this arrangement, gases are supplied through the engine 25 and pump 41 at rates which bear a definite relation to each other and a definite predetermined mixture of gases is supplied to the arc through the welding head 31. In order to permit adjustment of this mixture to any desired value, the effective length of the crank arm through which the pump 41 is operated may be changed by adjusting the position of a pin 48 at the left hand end of the connecting rod 39 in a slot 49 provided in the member 50 for this purpose. The manner of making this adjustment will be readily understood upon reference to Figs. 4 and 5 which show the details of the mechanical coupling between the connecting rods 35' and 39.

In order to avoid dead centers and to reduce fluctuations in the pressure of the gas delivered at the welding head 31, a plurality of engines and pumps may be used. An additional engine 51 and additional pump 52 are shown in Fig. 6. The construction and operation of this apparatus will be readily understood in view of the previous explanation. Where more than two gases are to be used one or more of the pumps may supply the additional gas or gases.

Fig. 7 shows a gas producer 53 adapted to produce a gas which is transmitted through a pipe 54, a flexible coupling 55 and a welding tool 56 to a weld formed between the parts 57 and 58 by an electric arc produced in any suitable manner between these parts and a fusible electrode 59 adapted to be advanced through the welding tool 56 toward the work at a rate of speed determined by the rate of its consumption in the arc. While the welding tool 56 has been shown as connected directly to the gas producer 53, it will be apparent that a gasometer may be connected to the branch 60 of the pipe 54 for the purpose of storing the gas to be supplied to the weld or that this gas may be supplied from suitable vessels through the pipe.

The gas producer 53 comprises a combustion chamber adapted to contain coke or other suitable fuel, an ash pit 62 sealed at the bottom by water contained in a pit 63 which is arranged to receive the ashes produced by combustion in the chamber 61 and to be lowered and raised by a toggle mechanism 64 for permitting removal of these ashes, and a water jacket 65 surrounding the combustion chamber 61. Steam produced in the water jacket 65 either escapes through a safety valve 66 or is transmitted to the combustion chamber 61 through a pipe 67 and a valve 68. A draft in the combustion chamber 61 is produced by air supplied from a suitable source through valve 69 and pipe 70. The gases of combustion are transmitted from the chamber 61 to the chamber 71 through tubes 72 and from this chamber either to the pipe 54 through valve 54ª or to the flue 73 through a water valve 74 arranged to be opened and closed by means of a threaded member 75. Water may be supplied from a pipe 76 either through a valve 77 to the water jacket 65 or through a valve 78 to the water valve 74. The combustion chamber 61 is sealed at the top by a cover 79 which is raised and lowered by a hand-wheel 80 to allow replenishment of the fuel in the combustion chamber.

Assuming the valves 68 and 54ª to be closed, the fuel in the chamber 61 to have been heated to incandescence and a sufficient amount of steam to have been generated in the water jacket 65, water gas, which comprises equal volumes of carbon monoxide and hydrogen, may be produced by closing valve 69 to shut off the supply of air to the combustion chamber 61 and admitting steam through the valve 68 to the chamber 61. In order that impurities be not conveyed to the welding head 56, it is desirable that the products of combustion be driven out through the flue 73 by the steam first admitted to the chamber 61 through the valve 68. When these products have been dissipated, the water valve 74 may be closed by movement of the piston, attached to the end of threaded member 75 and the valve 54ª may be opened to admit water gas either to the welding head 56 through valve 81 or to a gasometer through pipe 60 and valve 82.

The apparatus may be operated to produce any desired mixture of carbon monoxide and hydrogen by supplying oxygen from a suitable source to the chamber 61 through valve 69 and pipe 70. Thus carbon monoxide may be produced by feeding oxygen alone to the combustion chamber 61 or various mixtures of carbon monoxide and hydrogen may be produced by simultaneously admitting different proportions of steam and oxygen to the combustion chamber 61. It will be apparent that the gas producing apparatus may be utilized in connection with different types of welding apparatus and with automatic gas control apparatus such as that shown by Fig. 2.

The application of Irving Langmuir, Serial No. 729,185, filed July 30, 1924, for heating process and apparatus, assigned to the same assignee as the present application, discloses and claims method and apparatus for producing atomic hydrogen and carrying it over to the work where it is recombined, liberating heat. Whether or not heating of the work by the recombination of dissociated hydrogen may under certain circumstances be present to some extent when my invention is used, I make no claim to such subject matter since the Langmuir invention is earlier than my invention.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:—

1. The method of electric arc welding which comprises maintaining a welding arc between a fusible metallic electrode and the work, and discharging around the arc and upon the molten portions of the work an actively reducing gaseous medium comprising carbon monoxide.

2. The method of electric arc welding which comprises maintaining an arc and maintaining around the arc and molten portion of the work an active reducing gaseous medium composed of carbon monoxide and hydrogen.

3. The method of electric arc welding which comprises maintaining an arc and supplying to and dissociating in the arc a medium containing carbon and hydrogen but containing substantially no free oxygen to produce and surround the arc and the molten portion of the work with a gaseous mixture composed of carbon monoxide and hydrogen.

4. The method of electric arc welding which comprises maintaining an arc and maintaining around the arc and molten portion of the work an atmosphere of water gas.

In witness whereof I have hereunto set my hand this 12th day of August, 1925.

ELIHU THOMSON.